United States Patent [19]

Vallauri et al.

[11] Patent Number: 5,294,752
[45] Date of Patent: * Mar. 15, 1994

[54] MULTI-LAYER ELASTIC SLEEVES FOR ELECTRIC POWER CABLE JOINTS AND JOINTS THEREWITH

[75] Inventors: Ubaldo Vallauri, Monza; Bruno Parmigiani, Milan; Francesco Portas, Quattordio, all of Italy

[73] Assignee: Pirelli Cavi S.p.A., Milan, Italy

[*] Notice: The portion of the term of this patent subsequent to Dec. 15, 2009 has been disclaimed.

[21] Appl. No.: 464,370

[22] Filed: Jan. 12, 1990

[30] Foreign Application Priority Data

Jan. 16, 1989 [IT] Italy ............................ 19102A/89

[51] Int. Cl.5 ............... H02G 15/08; H02G 15/18
[52] U.S. Cl. .................... 174/73.1; 174/84 R; 174/93; 174/DIG. 8
[58] Field of Search .............. 174/73.1, 93, 88 C, 174/84 R; 29/235, 450

[56] References Cited

U.S. PATENT DOCUMENTS

| | | | |
|---|---|---|---|
| 3,515,798 | 6/1970 | Sieuert ............................ | 174/135 |
| 3,816,640 | 6/1974 | Varner . | |
| 3,990,479 | 11/1976 | Stine et al. ..................... | 138/125 |
| 3,992,567 | 11/1976 | Malia .............................. | 174/73 R |
| 4,006,288 | 2/1977 | Stevens .......................... | 174/73 R |
| 4,035,534 | 7/1977 | Nyberg . | |
| 4,079,189 | 3/1978 | Troccoli ......................... | 174/73 R |
| 4,238,639 | 12/1980 | Palmieri ......................... | 174/73 R |
| 4,304,616 | 12/1981 | Richardson ................... | 174/73 R X |
| 4,314,093 | 2/1982 | Eldridge et al. ............... | 174/73 R |
| 4,363,842 | 12/1982 | Nelson ........................... | 174/73 R X |
| 4,383,131 | 5/1983 | Clabburn ....................... | 174/73 R |
| 4,487,994 | 12/1984 | Bahder .......................... | 174/73 R |
| 4,503,105 | 3/1985 | Tomioka ........................ | 174/135 X |
| 4,613,533 | 9/1986 | Loomis et al. ................. | 428/36 |
| 4,654,241 | 3/1987 | Vallauri et al. ................ | 174/84 R |
| 4,698,458 | 10/1987 | Parmigiani et al. ........... | 174/73 R |
| 4,868,967 | 9/1989 | Helt et al. ...................... | 174/135 X |

FOREIGN PATENT DOCUMENTS

| | | |
|---|---|---|
| A83845 | 5/1982 | Australia . |
| B25177 | 6/1984 | Australia . |
| 0393495 | 10/1990 | European Pat. Off. . |
| 3001158 | 7/1980 | Fed. Rep. of Germany . |
| 1294665 | 11/1972 | United Kingdom . |
| 1337951 | 11/1973 | United Kingdom . |
| 2183935 | 6/1987 | United Kingdom ............. 174/73.1 |

OTHER PUBLICATIONS

3M advertisement, Transmission and Distribution, May 1980, p. 69.

*Primary Examiner*—Leo P. Picard
*Assistant Examiner*—Hyuny Sough
*Attorney, Agent, or Firm*—Brooks, Haidt, Haffner & Delahunty

[57] ABSTRACT

An electric covering for a joint between a pair of electric cables, a device including such covering in elastically expanded condition on a rigid tubular support and electric cable joints including such covering. The covering includes at least two elastic sleeves of cross-linked polymeric material, a first radially inner sleeve at least partly of insulating material and a second radially outward sleeve. To permit the covering to be elastically expanded and encircling the rigid support for a long period of time, e.g. two years, the two sleeves have different mechanical properties and in particular, the material of the second sleeve has a residual deformation, which is applied by elongation over a period of time, which is less than the residual deformation, similarly applied, to the material of the first sleeve. The covering can also include a radially innermost stress grading, elastic third sleeve of cross-linked polymeric material, and the sleeves can be in contact and bonded together at their contacting surfaces.

45 Claims, 2 Drawing Sheets

MULTI-LAYER ELASTIC SLEEVES FOR ELECTRIC POWER CABLE JOINTS AND JOINTS THEREWITH

FIELD OF THE INVENTION

The present invention relates to a device for forming joints between electric cables and in particular, joints of electric cables of the type in which a tubular covering is fitted and elastically tightened on the ends of two cables which face each other and surrounds the connection between the conductors of said cables.

The present invention relates to the joints of electric cables formed by means of the said device and a tubular covering for joints which is to be used to encircle the connection between the conductors of the cables and to tighten elastically on the end portions of the cables which face each other.

BACKGROUND OF THE INVENTION

The known devices for forming joints of cables are of the type in which at least a tubular covering, made of an electrically insulating material for at least a part of its thickness, surrounds the connection between the conductors and elastically tightens on the end portions of the cables which face each other in the joint.

Examples of known devices are described in the European Patent No. 149,032, in the German Patent No. 3,001,158 and in the Japanese Patent No. 54-49588.

All the known devices comprise a rigid tubular support on which a tubular covering for joints of cables is fitted in an elastically expanded condition and means for removing the support from the tubular covering in order to enable this latter to shrink elastically to embrace and tighten, always elastically, on the end portions of the two cables, which face or are adjacent each other, and thereby enclose the electrical and mechanical connection of the conductors of said cables.

The known devices have drawbacks which are linked to the above indicated known particular element of the devices themselves.

The known devices for forming joints have the diameter of the inner bore of the tubular support only a little greater than that of the outer diameter of the cables where the joints are to be formed so as to impose a stretching as small as possible, in the radial direction, on the elastically expansible tubular covering in order to avoid permanent plastic deformations which would prevent the tubular covering, once it is fitted on the connection between the conductors of the cables, from exerting the required tightening on the end portions of the cables.

The need of avoiding permanent plastic deformations in the tubular covering for joints of cables is in fact an essential need since if in a joint between cables the tubular covering enclosing the mechanical and electrical connection between the conductors of the cables has suffered a permanent plastic deformation in radial direction, the covering is no longer able to exert a sufficient compression on the end portions of the insulations of the cables embraced by said tubular covering. In these conditions, the joint runs the risk of becoming perforated under the action of the electric stresses applied to it during the use of the cable.

In fact, an insufficient radial pressure exerted by the tubular covering on the end portions of the insulations of the cables does not assure a complete absence of air bubbles or very small bubbles, between the surfaces in contact with each other and hence, does not assure a perfect tightness with respect to possible infiltration of traces of moisture between said surfaces.

Such requirements create difficult conditions for the above-mentioned elements of the devices for forming joints of cables, for the joints of cables, or for the tubular coverings of the joints due to the need, existing at present, for providing a plurality of rigid supports of diameters of different dimensions and related tubular coverings of diameters of different dimensions (to be fitted on the supports) in order to cover the wide range of diameters of the cables where the joints are to be made. The latter represents a drawback since it obliges the users to store a considerable number of sleeves and relative supports of different types in order to cover any possible situation.

To avoid risks of permanent deformation of the tubular coverings, the fitting of the coverings on the tubular supports is, at present, carried out immediately before effecting the joint. This is because a high elongation in radial direction maintained for a substantial period of time on a known tubular covering for joints fitted on a tubular support means results in the risk of causing in the covering a permanent plastic deformation in the radial direction which is greater the longer the time of application of said high elongation.

To effect the fitting of a tubular covering on a tubular support immediately before forming a joint means that the operation must be carried out in place with all the risks that this unavoidably involves because of the ambient conditions in the field which are difficult to control. Also, there is an unavoidable increase in the time for effecting the joints, and it is not possible to store the devices completely ready to apply to joints of electric cables.

BRIEF SUMMARY OF THE INVENTION

One object of the present invention is that of overcoming the above-stated limitations of the known technique by providing a device for fanning joints of cables which can be stored for a time up to two years and which can be used for joints of cables of a wide range of diameters and in particular, joints between cables of several different diameters, the ratio between the maximum diameters of cables to be jointed and the minimum diameter of cables to be joined being as high as 1.6 without causing any drawback in the joints realized thereby.

A further object of the present invention is that of providing tubular coverings for joints between cables which make possible the realization of said device.

In accordance with the present invention, the device for forming joints between electric cables comprises a rigid tubular support and a tubular covering for the connection of conductors of a pair of electric cables, said covering comprising at least a first and a second sleeve, both sleeves being elastically expansible in the radial direction, being coaxial and being superimposed one upon the other. The sleeves are made of compounds of a cross-linked polymeric material, and are fitted in a radially elastically expanded condition on said rigid support, the first sleeve, which is radially inside the second sleeve, being electrically insulating at least for, a part of its thickness, and the cross-linked compound forming the second sleeve has a residual deformation due to an elongation imposed for a period of time which is less than that of the compound forming the first sleeve.

Another object of the present invention is a joint for electric cables comprising an electrical and mechanical connection between the conductors of two cables and a covering for said connection comprising at least a first and a second sleeve, both sleeves being elastically expansible in radial direction, being coaxial and being superimposed one upon the other. The sleeves are made of a cross-linked polymeric material, surrounding said connection and tightly engaging the end portions of the insulations of the cables in a radially and elastically expanded condition, the first sleeve, which is radially inside the second sleeve, being electrically insulating at least for a part of its thickness, and the cross-linked compound forming the second sleeve having a residual deformation, due to an elongation imposed for a period of time, less than that of the compound forming the first sleeve.

A further object of the present invention is a covering for joints of electric cables comprising at least a first and a second sleeve, both sleeves being elastically expansible in radial direction, being coaxial and being superimposed one upon the other. The sleeves are made of compounds of a cross-linked polymeric material and are intended to surround the mechanical and electrical connection between the conductors of the cables and to tighten elastically on the end portions of the cables in radially elastically expanded conditions. The first sleeve, which is radially inside the second sleeve is electrically insulating for at least a part of its thickness, and the cross-linked compound constituting the second sleeve has a residual deformation, due to an elongation imposed for a period of time, less than that of the compound constituting the first sleeve.

BRIEF DESCRIPTION OF THE DRAWINGS

Other objects and advantages of the present invention will be apparent from the following detailed description of the presently preferred embodiments thereof, which description should be considered in conjunction with the accompanying drawings in which.

DETAILED DESCRIPTION OF EMBODIMENTS OF THE INVENTION

Figures 1, 3:
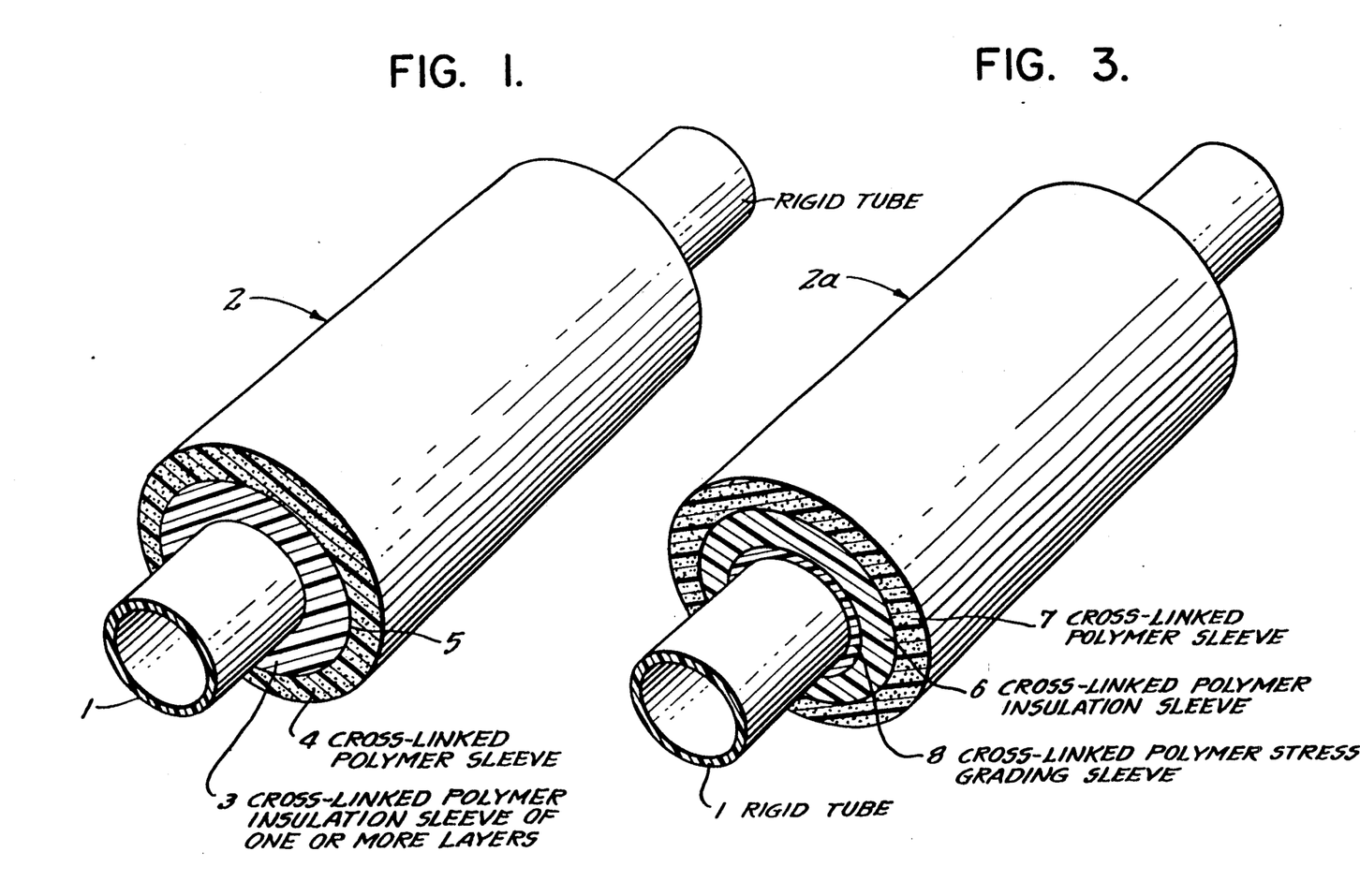
FIG. 1 is a perspective view of a device according to the invention for forming a joint between a pair of electric cables.
FIG. 3 is a perspective view of an alternative embodiment of a device according to the invention.

FIG. 1 shows, in perspective, an embodiment according to the invention of a device for forming joints of electric cables.

As shown in FIG. 1, the device has a rigid tubular support 1, for instance, a portion of a pipe of rigid polyvinylchloride (PVC), on which a tubular covering 2 for joints of electric cables is fitted in elastically expanded condition. The tubular covering 2, the structure of which will be described hereinafter, has such dimensions as to be able to be used for joints of cables of outer diameters of a wide range of values, for instance, of cables having an outer diameter between 21 mm and 33 mm.

Consequently, in the absence of elastic expansion, the diameter of the inner cylindrical base of the tubular covering 2 has a value which is suitable for forming joints in cables the outer diameters of which have the minimum value of the above-given range, for instance, in the absence of elastic expansion the diameter is on the order of 17 mm.

The tubular covering 2 has an overall thickness which is suitable for covering a joint for cables having outer diameters at the maximum value of the above-given range, for instance, in absence of elastic expansion, the overall thickness of the tubular covering 2 is on the order of 15 mm.

The inner diameter of the tubular support 1 is greater than the outer diameters of the cables having diameters at the maximum value of the cables to be joined by means of the device shown in FIG. 1.

For example, the rigid tubular support 1 has an inner diameter of 38 mm for the range of cable dimensions given by way of example.

Figure 2:
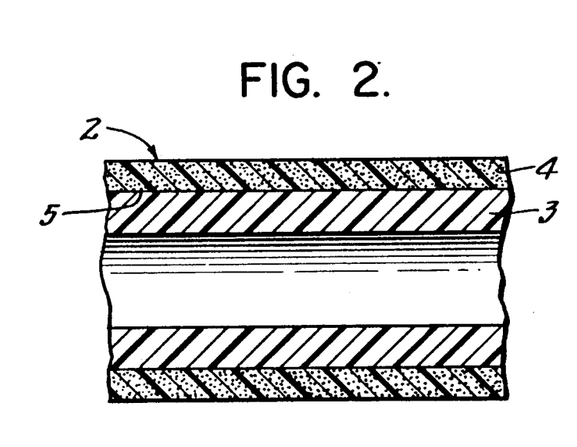
FIG. 2 is a longitudinal section of the tubular covering shown in FIG. 1 with the rigid inner tube removed.

The tubular covering 2, which is fitted in elastically expanded condition on the rigid tubular support 1, comprises a first sleeve 3 of a compound of a cross-linked polymeric material elastically deformable in radial direction and having characteristics described hereinafter, and a second sleeve 4 coaxial with and superimposed upon the first sleeve 3, the second sleeve 4 also being of a compound of a cross-linked polymeric material, being elastically deformable in radial direction and having the characteristics described hereinafter.

The first sleeve 3 and the second sleeve 4 are bonded to each other at the surface 5 where they are in mutual contact, and said bond is, for example, obtained by extruding or cross-linking the two sleeves 3 and 4 together when they are made up of compounds containing base polymers having chemical affinity.

Alternately, the sleeves 3 and 4 can be independent of each other, i.e. they are not mutually bonded at 5 where they are in mutual contact.

In any case, one of the essential characteristics for the purposes of the present invention is that the material constituting the second sleeve 4 has a residual deformation, due to an imposed stretching applied in time, smaller than that of the material constituting the first sleeve 3.

As previously stated, the first sleeve 3 is formed from a cross-linking polymeric material compound which is elastically deformable in the radial direction and which is electrically insulating.

The sleeve 3 has in radial direction a thickness not less than that necessary, from an electrical point of view, for providing joints for the maximum diameter cables of the set of cables to be joined.

Moreover, the first sleeve 3 is constituted by a cross-linked compound having a modulus E not lower than 0.05 kg/mm$^2$ and a percentage ultimate elongation not lower than 250% to avoid, during the fitting of the first sleeve 3 on the tubular support 1, the risk of tearing the sleeve 3.

Preferably the modulus E of the compound constituting the first sleeve is between 0.05 and 0.5 kg/mm$^2$.

An example of compound of cross-linkable polymeric material forming the first sleeve 3 is one having the following formula in parts by weight:

| | |
|---|---|
| ethylene-propylene copolymer, for example, that known on the market by the name "DUTRAL CO-054" and sold by Dutral S.p.A. | 100 |
| zinc oxide | 5 |
| stearic acid | 1 |
| lead oxide ($Pb_3O_4$) | 5 |
| calcined kaolin treated superficially with trimetoxyetoxyvinylxylane | 70 |
| triallyl cyanurate | 1.5 |
| paraffinic plasticizer | 18 |
| poly 1,2 dihydro 2,2,4 trimethylquinoline | 1.5 |
| mercaptobenzo imidazol | 2 |
| propylbenzene | 1.7 |
| $a, a'$, bis terbutylperoxy | 1.7 |

A first sleeve 3 made up of the compound set forth, after the cross-linking of the compound, has the following characteristics:

| | |
|---|---|
| ultimate tensile strength | 70 kg/mm$^2$ |
| percentage ultimate tensile elongation | 560% |
| modulus E | 0.15 kg/mm$^2$ |
| residual deformation due to an imposed elongation of 50% according to the UNI 7321-74 standards on a flat specimen at 100° C. and for a time of 500 hours | 28% |
| dielectric constant $\epsilon$, according to the ASTM D150 standards | 3 |
| volume resistivity according to ASTM D257 | 10$^{15}$ Ohm × cm |

According to one embodiment, the first sleeve 3, made entirely of an insulating material, is formed by assembling a plurality of coaxial tubular layers extruded together and made from insulating materials having different mechanical characteristics. Specifically, proceeding in the radial direction from inside towards outside, the layers constituting the first sleeve 3 have an increasing modulus E and a decreasing percentage ultimate elongation.

For example, if the first sleeve 3 is formed by two tubular layers the radially innermost one can have a modulus E of 0.10 kg/mm$^2$ and a percentage ultimate elongation of 550%, and the radially outermost layer can have a modulus E of 0.40 kg/mm$^2$ and an ultimate elongation of 280%.

The second sleeve 4 also is formed by a compound of a cross-linked polymeric material which is elastically deformable in the radial direction and the percentage ultimate tensile elongation of the compound forming the second sleeve 4 is not lower than 150% to avoid the risk of tearings. The modulus E of the compound has a value not less than twice the value of the modulus E of the compound forming the first sleeve 3.

For example, when the modulus E of the compound constituting the first sleeve 3 is between 0.05 and 0.5 kg/mm$^2$, the modulus E of the compound constituting the second sleeve is between 0.1 and 1.5 kg/mm$^2$.

Moreover, the residual deformation, due to an imposed stretching of a magnitude equal to that necessary for the purposes of the present invention applied for a time not shorter than two years and when subjected to a temperature comprised between the ambient temperature and the cable service temperature, of the compound forming the second sleeve 4 must be smaller than the residual deformation of the compound constituting the first sleeve 3.

Preferably, the compound constituting the second sleeve 4 has a residual deformation, due to an imposed stretching of 50%, smaller than 15%, determined with the procedure defined by the UNI 7321-74 standards on a flat specimen at 100° C., and applied for a time of 500 hours (a time much longer than the maximum time called for by said standards which is 72 hours).

Moreover, the thickness, measured in radial direction of the second sleeve 4, is chosen in such a way that with the elastic deformation or stretching received when the covering 2 is fitted on the rigid tubular support, said sleeve 4 can store sufficient energy to cause the first sleeve 3 not only to follow it during the elastic contraction that takes place during the fanning of the joint and during the removal of the tubular support 1 from the tubular covering 2, but also to cause the sleeve 3 to tighten sufficiently on the ends of the cables in the jointing zone.

Preferably, the radial thickness of the second sleeve 4 is not smaller than 20% the radial thickness of the first sleeve 3.

One example of compound of cross-linkable polymeric material for the second sleeve 4 has the following formula in parts by weight:

| | |
|---|---|
| ethylene-propylene copolymer, for example, that known by the name "DUTRAL TER - 046 E3" and sold by DUTRAL S.p.A. | 100 |
| conductive carbon black, for example, that known on the market by the name "VULCAN P" and sold by CABOT S.p.A. | 39 |
| superconductive carbon black, for example, that known on the market with the name "KETIEN EC" and sold by AKZO S.p.A. | 13 |
| zinc oxide | 5 |
| poly 1, 2 dihydro 2,2,4 trimethylquinoline | 1.5 |
| paraffinic plasticizer | 18.6 |
| paraffin | 4 |
| stearic acid | 1 |
| triallyl cyanurate | 1 |
| dicumyl peroxide | 5 |

In particular embodiment shown in FIG. 1, a second sleeve 4, formed by the descried cross-linked compound and having a thickness of 4 mm, has the following mechanical characteristics:

| | |
|---|---|
| ultimate tensile strength | 78 kg/mm$^2$ |
| percentage ultimate tensile elongation | 230% |
| modulus E | 0.5 kg/mm$^2$ |
| residual deformation due to an imposed elongation of 50% according to UNI 7321-74 standards on a flat specimen at 100° C. and for a time of 500 hours | 13% |
| volume resistivity according to ASTM D257 standards | 500 Ohm × cm |

Thus, such sleeve 4 is considered semi-conductive.

When the particular embodiment of a device for forming joints between cables shown in FIG. 1 and the tubular covering also shown in FIG. 2 are to be used to form joints between cables without an outer screen, the first sleeve 3 is made entirely of an electrically insulating polymeric material and the second sleeve 4 is made of a compound of a polymeric material for which there is no required electrical or dielectric property but such property is not to be excluded. It is to be understood that, for the scope of the present invention, the sleeve 4 can or cannot have good electrical or dielectric properties.

In fact, in the embodiment of FIG. 1, although the device can be used to provide joints between cables without an outer screen, the second sleeve 4 has semiconductive properties because it is formed from the previously disclosed cross-linked compound which is semiconductive.

Figure 4:
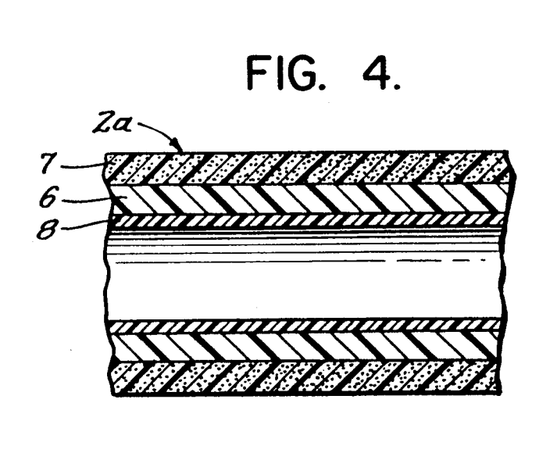
FIG. 4 is a longitudinal section of the tubular covering shown in FIG. 3.

FIG. 4 shows, in longitudinal section, an alternative embodiment of a tubular covering 2a according to the invention for forming joints between cables provided with an inner semiconductive layer and an outer semiconductive layer. FIG. 3 shows an alternative embodiment of a device for forming joints between cables according to the invention which comprises the tubular covering 2a shown in FIG. 4.

As shown in FIGS. 3 and 4, the tubular covering 2a is formed by three coaxial and superimposed sleeves 6, 7 and 8 bonded to one another in correspondence of the surfaces where they are in mutual contact, for example, by extruding and cross-linking the three sleeves together when they are made up of compounds having chemically similar base polymers. Alternatively, the three tubular sleeves are not mutually bonded, i.e. they are independent of one another.

In particular, the tubular covering 2a of FIGS. 3 and 4 is formed by a first sleeve 6 made of a compound of an electrically insulating, cross-linked polymeric material, for example, of the same compound, previously described, of which the first sleeve 3, in the particular embodiment shown in FIGS. 1 and 2, is made.

The first sleeve 6 has a thickness in the radial direction not less than that necessary from an electrical point of view for carrying out joints between cables having a diameter at maximum value of the range of cables for which the covering according to the invention is to be used. For example, with a pair of cables the outer diameters of which is between 21 and 33 mm, the thickness of the first sleeve 6 is on the order of 8 mm.

Radially outside the first sleeve 6, there is a second sleeve 7 made up of a compound of a cross-linked polymeric material, for example, of the compound previously given for the second sleeve 4 of the embodiment of FIGS. 1 and 2.

In the particular case of a pair of cables having diameters in the range from 21 to 33 mm, the thickness of the second sleeve 7 is on the order of 4 mm.

Radially inside the first sleeve 6 there is a third sleeve 8 (in the present specification also called a stress grading sleeve) made of a compound of cross-linked polymeric material having a dielectric constant $\epsilon$ not lower than 10.

The thickness of the third sleeve 8 is the minimum required to enable the sleeve 8 to carry out the function for which it is used in the pair of cables with which it is to be used. For example, with a pair of cables of diameters from 21 to 33 mm, the thickness of the sleeve 8 is on the order of 2 mm.

With respect to the mechanical properties of the third sleeve 8, and in particular the modulus E and the percentage ultimate elongation, they are similar to those of the first sleeve 6.

An example of compound of a cross-linkable polymeric material suitable for forming the third sleeve 8 has the following formula in parts by weight:

| | |
|---|---|
| ethylene-propylene copolymer, for instance that known on the market by the name "DUTRAL CO-054" and sold by Dutral S.p.A. | 100 |
| zinc oxide | 5 |
| carbon black, for example that known on the market by the name "HUBER N 990" and sold by DEGUSSA S.p.A. | 140 |
| paraffinic plasticizer | 40 |
| poly 1, 2 dihydro 2,2,4 trimethylquinoline | 1.5 |
| stearic acid | 1 |
| triallyl cyanurate | 1 |
| dicumylperoxide | 2 |

The characteristics of the described compound forming the third sleeve 8 are, after cross-linking, the following:

| | |
|---|---|
| ultimate tensile strength | 70 kg/mm$^2$ |
| percentage ultimate tensile elongation | 560% |
| modulus E | 0.15 kg/mm$^2$ |
| residual deformation due to an imposed stretching of 50% according to UNI 7321-74 standards on a flat specimen at 100° C. after a time of 500 hours | 28% |
| dielectric constant $\epsilon$ according to ASTM D150 standards | 15 |
| volume resistivity according to ASTM D257 standards | 10$^{10}$ Ohm × cm |

Figure 5:
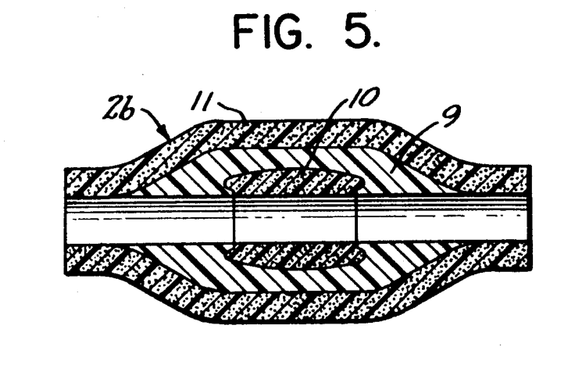
FIG. 5 is a longitudinal section of an alternative embodiment of a tubular covering according to the invention.

FIG. 5 represents in longitudinal section a further alternative embodiment of a tubular covering 2b for connections between conductors of cables according to the invention which when fitted on a rigid tubular support, such as the support 1, permits the carrying out of an alternative embodiment according to the invention of a device for forming joints between electric cables.

As shown in FIG. 5, the tubular covering 2b comprises a first sleeve 9, having tapered ends and made of an electrically insulating material, constituted by a compound of a cross-linked polymeric material, and a semiconductive tubular element 10 made of a compound of a cross-linked polymeric material embedded in the sleeve 9.

Radially outside the first sleeve 9, there is a second semiconductive sleeve 11 which extends beyond the ends of the sleeve 9 shown in FIG. 5.

The first sleeve 9 and the semiconductive element 10 embedded therein have the same mechanical characteristics as the first sleeves 3 and 6 of the embodiments shown in FIGS. 2 and 4 and previously described.

Moreover, the second sleeve 11, the radial thickness of which is not less than 20% the maximum value of the radial thickness of the first sleeve 9, has the same mechanical properties as the second sleeves 4 and 7 of the embodiments shown in FIGS. 2 and 4 and previously described.

Examples of compounds for the first sleeve 9 and for the second sleeve 11 are respectively those previously given for the sleeves 3 and 4 of FIGS. 1 and 2. An example of a compound for forming the semiconductive element 10 is the following given in parts by weight:

| | |
|---|---|
| ethylene-propylene copolymer for example that known on the market by the name "DUTRAL TER 054" and sold by Dutral S.p.A. | 100 |
| zinc oxide | 5 |
| conductive carbon black, for example that known on the market with the name "VULCAN P" and sold by CABOT S.p.A. | 80 |
| paraffinic plasticizer | 35 |
| stearic acid | 1 |
| poly 1,2 dihydro 2,2,4 trimethylquinoline | 1.5 |

-continued

| | |
|---|---|
| triallyl cyanurate | 2 |
| dicumyl peroxide | 3.2 |

The characteristics of the described compound which can be used for the semiconductive element 10, after cross-linking, are as follows:

| | |
|---|---|
| ultimate tensile strength | 1.1 kg/mm$^2$ |
| percentage ultimate tensile elongation | 520% |
| modulus E | 0.15 kg/mm$^2$ |
| residual deformation due to an imposed elongation of 50% according to the UNI 7321-74 standards on a flat specimen at 100° C. after a time of 500 hours | 28% |
| volume resistivity according to the ASTM D257 standards | 500 Ohm × cm |

Figure 6:
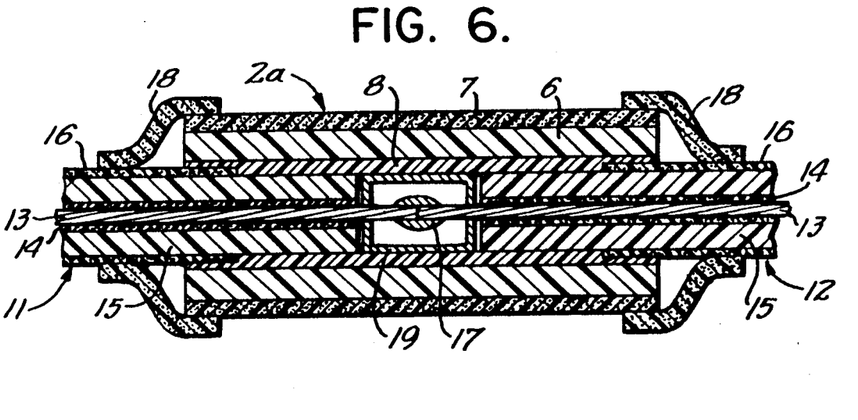
FIG. 6 is a longitudinal section of a joint between electric cables obtained by means of the device of FIG. 3.

FIG. 6 illustrates an embodiment of a cable joint according to the invention in which two cables 12 with extruded insulation and having, for example, an outer diameter of 26 mm, are interconnected.

Each cable 12 has a conductor 13, which can be made of stranded wire and, for example, of aluminum, and can have a section of 150 mm$^2$. Around the conductor 13, there is a semiconductive layer 14 having a thickness, for example, of 1.5 mm. On the layer 14, there is the insulation 15 of the cable having a thickness of 5.5 mm and which is externally coated with a semiconductive layer 16, having a thickness of 1 mm.

At both ends of the cables 12 present in the joint, the conductors 13 and the insulations 15 of the cables themselves are bared stepwise for a length.

The conductors 13 of the two cables 12 are arranged end-to-end and are electrically and mechanically interconnected such as by means of a metallic clamp or a soldering 17.

In the zone where the two conductors 13 are connected, there preferably is a metallic adaptor 19 of cylindrical shape, the outer diameter of which is the same as the outer diameters of the insulations 15 of the cables so that the outer surface of said, adaptor 19 is aligned with the outer surface of the insulations 15 of the cables.

A tubular covering 2a is elastically tightened in a known manner around the ends of the cables and the connection between the conductors of the cables, said tubular covering having the same structure and mechanical and electrical characteristics as those of the covering 2a of the particular embodiment previously described with reference to FIG. 4 and carried out with the device shown in FIG. 3. In fact, the tubular covering of the joint of FIG. 6 has, from the inside towards the outside, a stress grading third sleeve 8, an insulating first sleeve 6 and a semiconductive second sleeve 7.

Means are provided for carrying out the electrical connection between the semiconductive outer layer 16 of the cables and the semiconductive second sleeve 7. Such means can be, for example, end caps 18 of semiconductive material.

In the joint according to the invention in FIG. 6, the ends of the stress grading third sleeve 8 surround and engage both of the outer semiconductive layers 16 of the two cables.

Alternative embodiments of joints of cables according to the invention are those which can be obtained by fitting and tightening on the jointing zone of the conductors of the two cables the tubular coverings 2 and 2b of the embodiments previously disclosed with reference to FIGS. 2 and 5.

The methods for forming the joints according to the present invention by means of the devices forming the object of the present invention need not be described in detail since such methods are known per se.

From the description of the particular embodiments previously disclosed and from the following considerations, it will be understood that by means of the present invention the objects of the invention are achieved.

The essential element of the present invention is the presence of a sleeve, in the present description called second sleeve, having the property of showing a residual deformation, due to an elongation imposed for a period of time not shorter than 2 years and at a temperature comprised between the ambient temperature and the cable service temperature, less than that of any other sleeve coupled to it in a radially innermost position and called in the present description a first sleeve.

The second sleeve, unlike the first sleeve, because of the just stated property practically does not lose, with the passing of time, the ability of elastically shrinking.

Moreover, the second sleeve being arranged in a radially outer position with respect to the first sleeve is able to cause this latter to follow its own movements of elastic contraction.

Therefore, the presence of the second sleeve having the above-disclosed particular characteristic (and to which other characteristics, as, for example, the semi-conductivity, can be added) makes possible the formation of elements for forming joints of cables wherein the same covering for connections between conductors can be elastically expanded on a tubular support of such a size as to allow the forming of joints between cables of a wide range of diameters and permits the element to be stored for a long time thereby avoiding the need of fitting the tubular covering on the tubular support only when a joint between cables is being carried out.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. An electric cable joint sleeve device comprising:
   a rigid tubular support having a predetermined exterior cross-sectional size;
   a first elastic sleeve formed form a compound of a cross-linked polymeric material, said first elastic sleeve having an unstretched cross-sectional interior size less than said predetermined cross-sectional size of said support and being mounted on and encircling said support in elastically radially expanded condition, said first sleeve being electrically insulating for at least part of its radial thickness and said compound having a residual deformation, with an imposed elongation applied for a period of time, of a first predetermined value to which it returns elastically and without heating; and
   a second elastic sleeve formed from a compound of a cross-linked polymeric material encircling said first sleeve, and said second elastic sleeve having an unstretched cross-sectional interior size such that when said first sleeve is mounted on said support and said second elastic sleeve encircles said first sleeve, said second sleeve is in radially expanded condition and said compound from which said second sleeve is formed having a residual deformation, with an imposed elongation applied for a period of time, of a second predetermined value to which it returns elastically and without heating and which is less than said first predetermined value and which causes said first sleeve to reduce in internal diameter to a size less than said first predetermined value.

2. A sleeve device as set forth in claim 1 wherein aid imposed elongation on said compound from which said second sleeve is formed is on the order of 50% and is applied for 500 hours at °C. and wherein said second predetermined value is less than 15%.

3. A sleeve device as set forth in claim 1 wherein the radial thickness of said second sleeve is at least equal to 20% of the radial thickness of said first sleeve.

4. A sleeve device as set forth in claim 1, 2 or 3 wherein the interior surface of said second sleeve contacts and is bonded to the exterior surface of said first sleeve.

5. A sleeve device as set forth in claim 4 wherein said interior surface of said second sleeve is bonded to said exterior surface of said first sleeve by extruding said first sleeve and said second sleeve and cross-linking the materials thereof.

6. A sleeve device as set forth in claim 1, 2 or 3 wherein said compound from which said second sleeve is formed is semi-conductive.

7. A sleeve device as set forth in claim 1 wherein said compound from which said first sleeve is formed has a modulus E at least equal to 0.05 Kg/mm$^2$ and a percentage ultimate elongation at least equal to 250%.

8. A sleeve device as set forth in claim 1 or 7 wherein said compound from which said second sleeve is formed has a modulus E at least equal to twice the modulus E of said compound from which said first sleeve is formed and has a percentage ultimate elongation of at least 150%.

9. A sleeve device as set forth in claim 1 or 7 wherein the modulus E of said compound from which said first sleeve is formed is between 0.05 and 0.5 kg/mm$^2$ and the modulus E of said compound from which said second sleeve is formed is between 0.1 and 1.5 kg/mm$^2$.

10. A sleeve device as set forth in claim 1 further comprising a stress grading elastically expansible third sleeve intermediate said first sleeve and said support, said third sleeve being in radially elastically expanded condition and being formed of a compound of a cross-linked polymeric material having a dielectric constant at least equal to 10.

11. A sleeve device as set forth in claim 10 wherein the exterior surface of said third sleeve is in constant with and bonded to the interior surface of said first sleeve.

12. A sleeve device as set forth in claim 1, 2, 3, 10 or 12 wherein the compounds from which each layer is formed includes a polymeric material having a chemical affinity for the polymeric material of the next adjacent layer.

13. An electric cable joint sleeve device as set forth in claim 1 wherein said second sleeve has a radial thickness at least equal to 20% of the radial thickness of said first sleeve and is formed of a cross-linked polymeric material with a modulus E at least twice the modulus E of said first sleeve and wherein each second sleeve has a residual deformation, with an imposed elongation of 50% for a period of time of 500 hours, which is less than 15%.

14. An electric cable joint between a pair of cables having conductors and encircling insulation of a predetermined size with the insulation cut back to expose the conductors and with the ends of the conductors electrically interconnected, said joint comprising a covering for the interconnected conductor ends and said covering comprising:

a first elastic sleeve formed from a compound of a cross-lined polymeric material and being electrically insulating for at least part of its radial thickness and said compound having a residual deformation, with an imposed elongation applied for a period of time, of a first predetermined value to which it returns elastically and without heating;

a second elastic sleeve formed from a compound of a cross-linked polymeric material encircling said first sleeve and in radially expanded condition and said compound from which said second sleeve is formed having a residual deformation, with an imposed elongation applied for a period of time, of a second predetermined value to which it returns elastically and without heating and which is less than said first predetermined value and which causes said firs sleeve to reduce in internal diameter to a size which is less than said first predetermined value and less than said predetermined size of said insulation;

said covering at its axially central portion encircling said interconnected conductor ends and at its opposite ends elastically gripping at least the portions of said cables adjacent said interconnected cable ends; and whereby the second sleeve stores sufficient energy to cause the first sleeve not only to follow it during the elastic contraction that takes place during the removal of the tubular support from the joint sleeve but also to cause the first sleeve layer to tighten on the ends of the cables in the joint.

15. A joint as set forth in claim 14 wherein said imposed elongation on said compound from which said second sleeve is formed is on the order of 50% and is applied for 500 hours at 100° C. and wherein said second predetermined value is less than 15%.

16. A joint as set forth in claim 14 wherein the radial thickness of said second sleeve is at least equal to 20% of the radial thickness of said first sleeve.

17. A joint as set forth in claim 14, 15 or 16 wherein the interior surface of said second sleeve contacts and is bonded to the exterior surface of said first sleeve.

18. A joint as set forth in claim 17 wherein said interior surface of said second sleeve is bonded to said exterior surface of said first sleeve by extruding said first sleeve and said second sleeve and cross-linking the materials thereof.

19. A joint as set forth in claim 14, 15 or 16 wherein said compound from which said second sleeve is formed is semiconductive.

20. A joint as set forth in claim 14 wherein said compound from which said first sleeve is formed has a modulus E at least equal to 0.05 Kg/mm$^2$ and a percentage ultimate elongation at least equal to 250%.

21. A joint as set forth in claim 14 or 20 wherein said compound from which said second sleeve is formed has a modulus E at least equal to twice the modulus E of said compound from which said first sleeve is formed and has a percentage ultimate elongation of at least 150%.

22. A joint as set forth in claim 14 or 20 wherein the modulus E of said compound from which said first sleeve is formed is between 0.05 and 0.5 kg/mm² and the modulus E of said compound from which said second sleeve is formed is between 0.1 and 1.5 kg/mm².

23. An electric cable joint between a pair of cables having conductors and encircling insulation with the insulation cutback to expose the conductors and with the ends of the conductors electrically interconnected, said joint comprising a covering for the interconnected conductor ends and said covering comprising:

a first elastic sleeve comprising at least two co-extruded tubular layers of compounds of cross-linked polymeric material, the compound of the radially innermost layer having a percentage ultimate tensile elongation greater than, and a modulus E lower than, the radially outermost layer and said first sleeve being electrically insulating for at least part of its radial thickness an said compounds having a residual deformation, with an imposed elongation applied for a period of time, of a first predetermined value a second elastic sleeve formed from a compound of a cross-linked polymeric material encircling said first sleeve and in radially expanded condition and said compound from which said second sleeve is formed having a residual deformation, with an imposed elongation applied for a period of time, of a second predetermined value which is less than said first predetermined value; and said covering at its axially central portion encircling said interconnected conductor ends and at its opposite ends elastically gripping at least the portions of said cables adjacent said interconnected cable ends.

24. A joint as set forth in claim 14 further comprising a stress grading elastically expansible third sleeve intermediate said first sleeve and is a conductor ends said third sleeve being in radially elastically expanded condition and being formed of a compound of a cross-linked polymeric material having a dielectric constant at least equal to 10.

25. A joint as set forth in claim 24 wherein the exterior surface of said third sleeve is in contact with and bonded to the interior surface of said first sleeve.

26. A joint as set forth in claim 14, 15, 16, 23, 24 or 25 wherein the compounds from which each layer is formed includes a polymeric material having a chemical affinity for the polymeric material of the next adjacent layer.

27. A tubular covering for a joint between the conductor of a pair of cables, said covering comprising:

a first elastic sleeve formed from a compound of a cross-linked polymeric material and being electrically insulating for at least part of its radial thickness and said compound having a residual deformation, with an imposed elongation applied for a period of time, of a first predetermined value at which it returns elastically and without heating; and a second elastic sleeve formed from a compound of a cross-linked polymeric material encircling said first sleeve, and said compound from which said second sleeve is formed having a residual deformation, with an imposed elongation applied for a period of time, of a second predetermined value to which it returns elastically and without having and which is less than said first predetermined value and which causes said first sleeve to reduce in internal diameter to a size less than said first predetermined value.

28. A tubular covering as set forth in claim 27 wherein said imposed elongation on said compound from which said second sleeve is formed is on the order of 50% and is applied for 500 hours at 100° C. and wherein said second predetermined value is less than 15%.

29. A tubular covering as set forth in claim 27 wherein the radial thickness of said second sleeve is at least equal to 20% of the radial thickness of said first sleeve.

30. A tubular covering as set forth in claim 27, 28 or 29 wherein the interior surface of said second sleeve contacts and is bonded to the exterior surface of said first sleeve.

31. A tubular covering as set forth in .claim 30 wherein said interior surface of said second sleeve is bonded to said exterior surface of said first sleeve by extruding said first sleeve and said second sleeve and cross-linking the materials thereof.

32. A tubular covering as set forth in claim 27, 28 or 29 wherein said compound from which said second sleeve is formed is semiconductive.

33. A tubular covering as set forth in claim 27 wherein said compound from which said first sleeve is formed has a modulus E at least equal to 0.05 Kg/mm² and a percentage ultimate elongation at least equal to 250%.

34. A tubular covering as set forth in claim 27 or 33 wherein said compound from which said second sleeve is formed has a modulus E at least equal to twice the modulus E of said compound from which said first sleeve is formed and has a percentage ultimate elongation of at least 150%.

35. A tubular covering as set forth in claim 27 or 33 wherein the modulus E of said compound from which said first sleeve is formed is between 0.05 and 0.5 kg/mm² and the modulus E of said compound from which said second sleeve is formed is between 0.1 and 1.5 kg/mm².

36. A tubular covering as set forth in claim 27 further comprising a stress grading elastically expansible third sleeve intermediate said first sleeve and said conductor ends said third sleeve being in radially elastically expanded condition and being formed of a compound of a cross-linked polymeric material having a dielectric constant at least equal to 10.

37. A tubular covering as set forth in claim 36 wherein the exterior surface of said third sleeve is in contact with and bonded to the interior surface of said first sleeve.

38. A tubular covering as set forth in claim 27, 28, 29, 36 or 37 wherein the compounds from which each layer is formed includes a polymeric material having a chemical affinity for the polymeric material of the next adjacent layer.

39. An electric cable joint sleeve device comprising:
a rigid tubular support having a predetermined exterior cross-sectional size;
a first elastic sleeve comprising at least two co-extruded tubular layers of compounds of cross-linked polymeric material, the compound of the radially innermost layer having a percentage ultimate tensile elongation greater than, and a modulus E lower than, the radially outmost layer, said first elastic sleeve having an unstretched cross-sectional interior size less than said predetermined cross-sectional size of said support and being mounted on and encircling said support in elastically radially expanded condition, said first sleeve being electrically insulating for at least part of its radial thickness and said compound having a residual deformation, with an imposed elongation applied for a period of time, of a first predetermined value; and a second elastic sleeve formed form a compound of a cross-linked polymeric material encircling said first sleeve, and said second elastic sleeve having an unstretched cross-sectional interior size such that when said first sleeve is mounted on said support and said second elastic sleeve encircles said first sleeve, said second sleeve is in radially expanded condition and compound form which said second sleeve is formed having a residual deformation, with an imposed elongation applied for a period of time, of a second predetermined value which is less than said first predetermined value.

40. A sleeve device as set forth in claim 39 wherein the compounds from which each layer is formed includes a polymeric material having a chemical affinity for the polymeric material of the next adjacent layer.

41. A joint as set forth in claim 23, wherein the compounds from which each layer is formed includes a polymeric material having a chemical affinity for the polymeric material of the next adjacent layer.

42. A tubular covering for a joint between the conductors of a pair of cables, said covering comprising:

a first elastic sleeve comprising at least two coextruded tubular layers of compounds of cross-linked polymeric material, the compound of the radially innermost layer having a percentage ultimate tensile elongation greater than, and modulus E lower than, the radially outermost layer and said firs sleeve being electrically insulting for at least part of its radial thickness and said compounds having a residual deformation, with an imposed elongation applied for a period of time, of a first predetermined value; and a second elastic sleeve formed from a compound of a cross-linked polymeric material encircling said first sleeve, and said compound form which said second sleeve is formed having a residual deformation, with an imposed elongation applied for a period of time, of a second predetermined value which is less than said first predetermined value.

43. A tubular covering as set forth in claim 42 wherein the compounds from which each layer is formed includes a polymeric material having a chemical affinity for the polymeric material of the next adjacent layer.

44. An electric cable joint as set forth in claim 14 wherein said second sleeve has a radial thickness at least equal to 20% of the radial thickness of said first sleeve and is formed of a cross-linked polymeric material with a modulus E at least twice the modulus E of said firs sleeve and wherein said second sleeve has a residual deformation, with an imposed elongation of 50% for a period of time of 500 hours, which is less than 15%.

45. A tubular covering as set forth in claim 27 wherein said second sleeve has a radial thickness at least equal to 20% of the radial thickness of said first sleeve an is formed of a cross-linked polymeric material with a modulus E at least twice the modulus E of said first sleeve and wherein said second sleeve has a residual deformation, with an imposed elongation of 50% for a period of time of 500 hours, which is less than 15%.

* * * * *

UNITED STATES PATENT AND TRADEMARK OFFICE
CERTIFICATE OF CORRECTION

PATENT NO. : 5,294,752
DATED : March 15, 1994
INVENTOR(S) : Vallauri et al

It is certified that error appears in the above-indentified patent and that said Letters Patent is hereby corrected as shown below:

```
col. 2, line 65,    after "for" delete the comma (,);
col. 6, line 14,    change "fanning" to --forming--;
col. 6, line 42,    change "descried" to --described--;
col. 9, line 43,    after "said" delete the comma (,);
col. 10, line 50,   change "form" to --from--;

col. 11, line 54,   change "constant" to --contact--;
col. 11, line 57,   change "12" to --11--.
col. 12, line 11,   change "cross-lined" to --cross-linked--;
col. 12, line 27,   change "firs" to --first--;
col. 13, line 21,   change "an" to --and--;
col. 13, line 39,   after "ends" insert a comma (,);
col. 13, line 53,   change "ductor" to --ductors--;
col. 13, line 59,   change "at" to --to--;
col. 13, line 67,   change "having" to --heating--;
col. 14, line 45,   after "ends" insert a comma (,);

col. 14, line 66,   change "outmost" to --outermost--;
```

UNITED STATES PATENT AND TRADEMARK OFFICE
CERTIFICATE OF CORRECTION

PATENT NO. : 5,294,752
DATED : March 15, 1994
INVENTOR(S) : Vallauri et al

It is certified that error appears in the above-indentified patent and that said Letters Patent is hereby corrected as shown below:

```
col. 15, line 8,  change "form" to --from--;
col. 15, line 15, change "form" to --from--;
col. 16, line 1,  change "firs" to --first--;
col. 16, line 8,  change "form" to --from--;
col. 16, line 23, change "firs" to --first--;
col. 16, line 30, change "an" to --and--.
```

Signed and Sealed this

Fourth Day of October, 1994

Attest:

BRUCE LEHMAN

*Attesting Officer*  *Commissioner of Patents and Trademarks*